ён
2,828,278

RESIN FROM POLYESTERS AND AROMATIC VINYL COMPOUNDS

Milton Kosmin, Dayton, Ohio, assignor to Monsanto Chemical Company, St. Louis, Mo., a corporation of Delaware No Drawing. Application March 11, 1954
Serial No. 415,708

4 Claims. (Cl. 260—45.4)

This invention relates to synthetic resins and more particularly provides linear polyester resins which are reactive under curing conditions with compounds having activated carbon atoms to give cross linked resin materials. The invention also provides new and valuable cross linked copolymers of said polyesters.

According to the invention new polyester resins are prepared by heating a dibasic organic acid with a dicyclohexanol compound of the formula

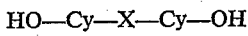

HO—Cy—X—Cy—OH in which X is a bivalent hydrocarbon radical free of non-benzenoid unsaturation and containing from 1 to 14 carbon atoms and Cy is a saturated hydrocarbon radical having a 6 carbon atom ring which ring is attached to said HO and said X.

One class of dicyclohexanols having the above formula and useful for the present purpose are the 4,4'-alkylidenedicyclohexanols which are obtainable by hydrogenation of phenol-ketone condensation products. As examples of the alkylidenedicyclohexanols may be mentioned: 4,4'-isopropylidenedicyclohexanol which is the hydrogenation product of 4,4'-isopropylidenediphenol (obtained from phenol and acetone), 4,4'-isopropylidene bis(3-ethylcyclohexanol); 4,4'-ethylidenedicyclohexanol; 4,4'-ethylidene-bis(dimethylcyclohexanol); 4,4'-(butylidene)bis(6-tert-butyl-meta-cresol); 4,4'-(3-hexylidenedicyclohexanol); 2,3'-isopropylidenedicyclohexanol; 3,3'-ethylidenebis(2-methylcyclohexanol); 3,4'-(2-amylidene)-bis-octylcyclohexanol); 4,4'-cyclohexylidenebis(2-isopropylcyclohexanol); 4,4'-benzylidenedicyclohexanol; 4,4'-heptylidenebis(2-isopropylcyclohexanol); etc.

Another class of dicyclohexanols which is useful in preparing the present polyesters consist of methylene or polymethylene dicyclohexanols obtainable by reduction of phenolic ketones, for example the 4,4'-methylenedicyclohexanol prepared by Clemmensen reduction of 4,4'-dihydroxybenzophenone, or those obtained by reduction of (hydroxyphenol)-substituted olefins, e. g., the 4,4'-ethylenedicyclohexanol prepared by hydrogenation of 4,4'-dihydroxy-stilbene. Examples of other methylene or polymethylene dicyclohexanols which may be used are 3,3'-methylenebis(2,3-dimethylcyclohexanol), 4,4'-tetramethylene bis(3-ethylcyclohexanol), 4,4'-octamethylenedicyclohexanol, 2,4'-ethylenebis(3-dodecylcyclohexanol), 4,4'-(butylethylene)dicyclohexanol, 4,4'-(1,2-cyclohexylene)dicyclohexanol, 4,4'-(3-methyl-1,2-cyclopentylene)-dicyclohexanol, etc.

Organic dicarboxylic acids used with the dicyclohexanols for the preparation of the present polyester resins are olefinic or aromatic, saturated or unsaturated, dicarboxylic acid compounds generally. For most purposes in order to obtain resins of a brittle rather than waxy or liquid nature it is advantageous to employ as the dibasic acid constituent a hydrocarbon dicarboxylic acid compound having from 2 to 14 carbon atoms in the molecule. Either the free acids, the acid anhydrides or the acyl halides may be used. As examples of useful dicarboxylic compounds may be mentioned the α,β-unsaturated acids or the anhydrides or acyl halides thereof, such as maleic acid, maleic anhydride, maleyl chloride, fumaric acid, itaconic acid, itaconic anhydride, itaconoyl bromide, mesaconic acid, citraconic acid, etc.; the alkanedicarboxylic acids, anhydrides or acyl halides thereof such as oxalic or malonic acid, anhydride, or acyl halide; succinic acid, anhydride or halide; adipic acid or anhydride, sebacic acid or anhydride; the cycloparaffindicarboxylic acids such as 1,2-cyclohexanedicarboxylic acid or its anhydride or acyl halide, the aromatic dicarboxylic acids such as phthalic, terephthalic or 1,2-naphthalenedicarboxylic acid, or the anhydrides or acyl halides thereof. A mixture of 2 or more different dicarboxylic acids may be employed, for example, a mixture of maleic acid and phthalic anhydride or a mixture of maleic anhydride, fumaric acid and terephthalic acid.

The dicyclohexanol compound is an essential initial reactant as a hydroxy component in the preparation of the present polyesters; however, other dihydroxy compounds may be incorporated into the reaction mixture in minor proportions with respect to the alkylenedicyclohexanol compound. Such dihydroxy compounds may be aliphatic or aromatic glycols such as ethylene glycol, propylene glycol, 1,4-butanediol; hydroquinone, 1,2-dihydroxynaphthalene, 4,4'-dihydroxybiphenyl, 4,4'-isopropylidenediphenol, 4,4'-(2-butylidene)di-m-cresol, etc.

The present linear polyesters are generally colorless or only slightly yellow, transparent resinous materials of a brittle, non-tacky, glass-like nature. They are thus particularly valuable as constituents of dry curing stocks. When heated under curing conditions, either alone or with compounds having activated carbon atoms, they give tough, resinous materials which possess significant resistance to distortion under heat and pressure, low percent volume shrinkage, and very good stability to light and moisture.

Compounds having activated carbon atoms and reactive under curing conditions with the polyesters to give tough, cross linked resins are, for example, alkylene, cycloalkylene or arylene isocyanates or isothiocyanates such as ethylene diisocyanate, trimethylene diisothiocyanate, cyclohexylene-1,2-diisocyanate, or 1,4-diphenylenediisocyanate; polyfunctional compounds such as glycerine, diethanolamine, diethylenetriamine, tricarballylic acid; alkenyl esters of α,β-unsaturated dicarboxy acids such as allyl fumarate or maleate; compounds containing a vinyl ($CH_2$:CH—) radical and copolymerizable with said linear esters such as vinyl acetate, methyl vinyl ketone or styrene, etc.

The copolymers obtained by heating the present linear polyesters with a monovinyl aromatic compound or mixtures of such compound under curing conditions are of exceptional interest in that they comprise valuable resinous materials of high utility in the preparation of moldings, castings, laminates and fibers. Moldings and castings formed from such copolymers are transparent, substantially colorless, tough products which are characterized by unusually good dimensional stability, and resistance to heat and moisture. Fibers may be prepared from the cured polyester-vinyl-aromatic compound copolymers by conventional melt spinning operations involving extrusion of the melted polymer through a die or spinneret into a cooling medium. The subsequently stretched fibers possess high tensile strengths, very good chemical resistance and desirable elongation and toughness.

Mono-vinyl aromatic compounds useful for the preparation of the present cured or cross-linked copolymers are compounds in which one vinyl group is attached to a carbon atom of a benzene, biphenyl, naphthalene, fluorene, or acenaphthene ring structure. The ring may contain other substituents such as chlorine, fluorine, methoxy, methyl, hydroxy, trichloromethyl, trifluoromethyl or acetyl. As illustrative of compounds included within the scope of monovinyl aromatic compounds may be mentioned styrene, 3,4-dichlorostyrene, 4-fluorostyrene, 4-methylstyrene, 3-(trifluoromethyl)-styrene, 4-methoxystyrene, 4-acetylstyrene, α-vinylnaphthalene, 4-vinylbiphenyl, 3-vinylfluorene, 2-vinylacenaphthene, etc.

In the preparation of the present linear polyesters the dicarboxylic acid compound is mixed with the dicyclohexanol in the presence or absence of another dihydroxy compound such as an aliphatic glycol having a continuous aliphatic hydrocarbon chain between the two hydroxy groups and the resulting mixture is heated at progressively increasing temperatures until a very high molecular weight is achieved. The dicarboxylic component and the dihydroxy component are employed in substantially stoichiometric proportions although generally the dicarboxylate is present in very slight excess in order to assure participation of all of the dicyclohexanol in the reaction. The esterification is preferably conducted in an oxygen-free atmosphere for example nitrogen, carbon dioxide or other inert gaseous atmospheres. Advantageously, the mixture of dicarboxylic compound and the dicyclohexanol is heated up gradually, say at a rate of from 1 to 5° C. per minute to a temperature of say from 150° C. to 250° C. and the reaction mixture is maintained within this temperature range until esterification is completed. Depending upon the nature of the individual reactants and the quantities thereof employed completion of the reaction is noted by no further change in viscosity of the mixture, is obtained within a time of, say, from 1 to 10 hours. After the reaction is complete it is often desirable to continue the heating, desirably at a pressure below atmospheric, for the purpose of evolving traces of water or any unreacted materials.

The molecular weight of the linear polyester will depend to some extent on the proportion of reactants employed. High molecular weights are generally obtainable when the hydroxy compound and the dicarboxylic compound are used in substantially equimolar proportions. A substantial excess of either the hydroxy compound or the acid compound may reduce the molecular weight.

Alternative procedures may involve the use of a mixture of 2 or more dicarboxylic acids, for example, a mixture of terephthalic acid, phthalic acid or a mixture of fumaric acid and maleic anhydride. As hereinbefore stated a dihydroxy compound other than the alkylenedicyclohexanol may be used in minor proportions say in quantities of up to 50 percent of the total hydroxy compounds present in the initial reaction mixture. One procedure for obtaining high molecular weight linear polyesters from mixtures of hydroxy compounds is to condense the dicarboxylic acid with a small amount, say from 1 to 20 mole percent of an alkylene glycol such as ethylene glycol to obtain a low molecular weight product and then to continue the reaction by heating this material with from 80 to 99 mole percent of the dicyclohexanol. This procedure may also be employed in preparing the linear polyesters from a mixture of dicarboxylic components; thus, terephthalic acid may be condensed with an excess of the dicyclohexanol to form a low molecular weight polyester having hydroxy groups in the terminal position. These low molecular weight polyesters are readily prepared at lower temperatures. These polyesters are then reacted with another dicarboxylic acid compound, say adipic anhydride, in a proportion equivalent to the excess alkylenedicyclohexanol previously used. Further condensation at higher temperatures will form the mixed polyester with the various carboxylate groups dispersed more or less randomly along the molecule chain.

Curing the linear polyester to obtain a tough, cross-linked, heat-stable product is carried out by heating it either alone or in admixture with a compound containing an activated carbon atom at temperatures of say from 80° C. to 150° C. in the presence of a polymerization catalyst, say, benzoyl peroxide, tert-butyl benzoate, tert-butyl hydroperoxide, cumene hydroperoxide, potassium persulfate, α,α'-azobisisobutyronitrile. The products obtained by autopolymerization, i. e., the homopolymers obtained by subjecting the linear polyesters to curing conditions in the absence of extraneous cross-linking materials, are tough, horny products of very good thermal properties. Because the present linear polyesters are compatible with styrene or other vinylaromatic compounds in all proportions they are of particular utility in the preparation of cured copolymers from such monomers as styrene. Mixtures of the linear ester and the vinyl aromatic compound may be prepared for use as laminating or impregnating compounds. Such mixtures are substantially stable under ordinary conditions of temperature and pressure; however, when they are to be stored for any length of time it is advisable to incorporate them with an inhibitor of polymerization, for example, p-tert-butylcatechol.

The invention is further illustrated, but not limited, by the following examples:

Example 1

A mixture consisting of 196.9 g. (0.82 mole) of 4,4'-isopropylidenedicyclohexanol, 50.3 g. (0.34 mole) of phthalic anhydride and 33.3 g. (0.34 mole) of maleic anhydride was up-heated at a rate of 2.9° C./minute to a temperature of 200° C. and maintained at this temperature for 3 hours. Samples of the reaction mixture removed at hourly intervals, were mixed with styrene monomer (50 parts by weight of reaction product per 100 parts of styrene) and the resulting mixtures were tested for acid value and viscosity. At the end of 1 hour of heating at 200° C. the acid value of the test mixture was 65.6, the Gardner viscosity was Z4–Z5 and the viscosity in poises was 63.4–98.5. After 2 hours of heating at this temperature, the test mixture had an acid value of 48.8, a Gardner viscosity of Z6+ and a viscosity in poises of 148+. At the end of 3 hours of heating at 200° C. both viscosity values were unchanged.

The linear polyester thus obtained was a brittle, glassy material which when powdered displayed no tackiness. It was compatible in all proportions with styrene monomer and had an acid value of 41.3. A mixture of 75 parts by weight of the polyester and 100 parts by weight of styrene monomer containing 1.5 percent by weight of benzoyl peroxide showed no change after storage for 10 days at a temperature of 27° C.

Example 2

This example shows preparation of a cured copolymer of the polyester of Example 1 and styrene. 100 parts by weight of styrene monomer containing 0.058 percent of para-tert-butylcatechol as inhibitor was mixed with 75 parts by weight of the linear polyester prepared in Example 1. The temperature of the mixture was brought to 130° C. and there was then added 1.5 percent by weight, based on the weight of the total mixture, of a catalyst consisting of a 1:1 mixture of benzoyl peroxide and tricresyl phosphate. Heating at 130° C. was continued for 10 minutes. The cured resin thus obtained was labelled Resin A.

For purposes of comparison a cross-linked polyester-styrene type resin was similarly prepared by first preparing a linear polyester from 0.5 mole of maleic anhydride, 0.5 mole of phthalic anhydride and 0.2 mole of propylene glycol and then heating 75 parts by weight of this linear polyester with 100 parts by weight of the inhibited styrene monomer and 1.5 percent by weight of the benzoyl peroxide-tricresyl phosphate catalyst for 10 minutes at 130° C. The cured resin thus obtained was labelled Resin B.

Testing of the cured resins thus obtained gave the following values:

|  | Resin A | Resin B |
|---|---|---|
| Volume Percent Shrinkage | 7.3 | 11.8. |
| Percent weight change after 7 days water immersion. | −0.12 | +0.65. |
| 100 hours weatherometer | Faint yellow tinge. | Markedly yellow. |

The above shrinkage values were determined on resins cured at 130° C. for 10 minutes in a cavity mold 1" x 1" x 1/8". Physical dimensions of the cavity and of the cured resin were measured with a micrometer caliper and the percent volume shrinkage determined from the measurements thus obtained. Molded discs of the cured copolymer of styrene and the linear polyester of Example 1 had good impact strength, good resistance to heat distortion and excellent electrical properties.

Operating as in the above examples, other linear polyesters of 4,4'-isopropylidenedicyclohexanol may be similarly prepared and cured, for example, instead of the mixture of phthalic anhydride and maleic anhydride either anhydride, alone, may be used; or there may be employed fumaric acid alone, adipic acid alone, sebacic acid alone, or mixtures comprising various proportions of such acids. Also instead of 4,4'-isopropylidenedicyclohexanol there may be employed polymethylenedicyclohexanols such as ethylenedicyclohexanol or hexamethylenedicyclohexanol or other alkylidenedicyclohexanols, e. g., 4,4'-ethylidene-bis(3-tert-amylcyclohexanol).

Cured copolymers of improved heat distortion properties may be generally prepared by employing in the mixture which is to be cured from 10 percent to 90 percent of the present linear polyester and from 90 percent to 10 percent of a polymerizable vinyl compound or of a cross-linking compound such as an alkylene or arylene diisocyanate. The brittle glassy linear polyesters are of particular value when ground into finely divided particles for use as molding powders in the preparation of molded objects of very good dimensional stability. Solutions of the linear polyesters in copolymerizable vinyl compounds are useful as impregnating or bonding resins in the manufacture of wood compositions, laminates of paper and/or wood and as baking enamels.

Many apparently widely different embodiments of this invention may be made without detracting from the spirit and scope thereof.

What I claim is:

1. A resinous product comprising the cured copolymer of a mono-vinyl aromatic compound and a linear polyester of an olefinic dicarboxylic acid of from 2 to 14 carbon atoms and a dicyclohexanol compound of the formula HO—Cy—X—Cy—OH in which X is a bivalent hydrocarbon radical free of non-benzenoid unsaturation and containing from 1 to 14 carbon atoms and Cy is a saturated hydrocarbon radical having a 6 carbon atom ring which ring is attached to said HO and said X.

2. A resinous composition comprising the copolymer of styrene and a linear polyester of an olefinic dicarboxylic acid of from 2 to 14 carbon atoms and a dicyclohexanol compound of the formula HO—Cy—X—Cy—OH in which X is a bivalent hydrocarbon radical free of non-benzenoid unsaturation and containing from 1 to 14 carbon atoms and Cy is a saturated hydrocarbon radical having a 6 carbon atom ring which ring is attached to said HO and said X.

3. A resinous composition comprising the copolymer of styrene and the linear polyester of 4,4'-isopropylidenedicyclohexanol and an olefinic dicarboxylic acid of from 2 to 14 carbon atoms.

4. A resinous product comprising the copolymer of styrene and the linear polyester of 4,4'-isopropylidenedicyclohexanol and a mixture of phthalic acid and maleic acid.

References Cited in the file of this patent

UNITED STATES PATENTS

| 2,068,634 | Bruson et al. | Jan. 19, 1937 |
| 2,255,313 | Ellis | Sept. 9, 1941 |
| 2,634,251 | Kass | Apr. 7, 1953 |